Oct. 10, 1967   A. J. MARX   3,345,687
INJECTION MOLDING APPARATUS
Filed June 10, 1964   4 Sheets-Sheet 1

Inventor:
Arthur J. Marx
by Otto Fuchy
His Attorney

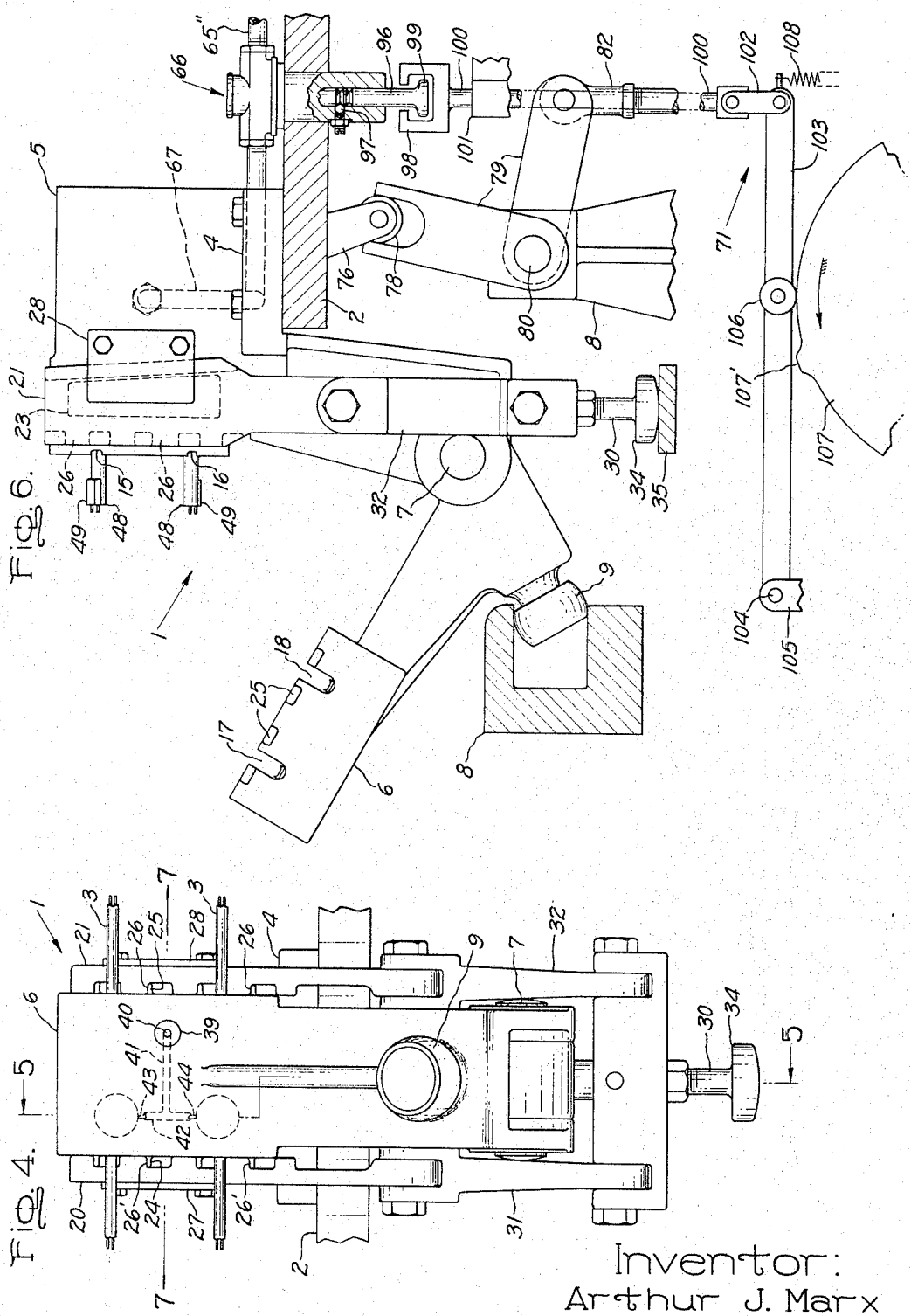

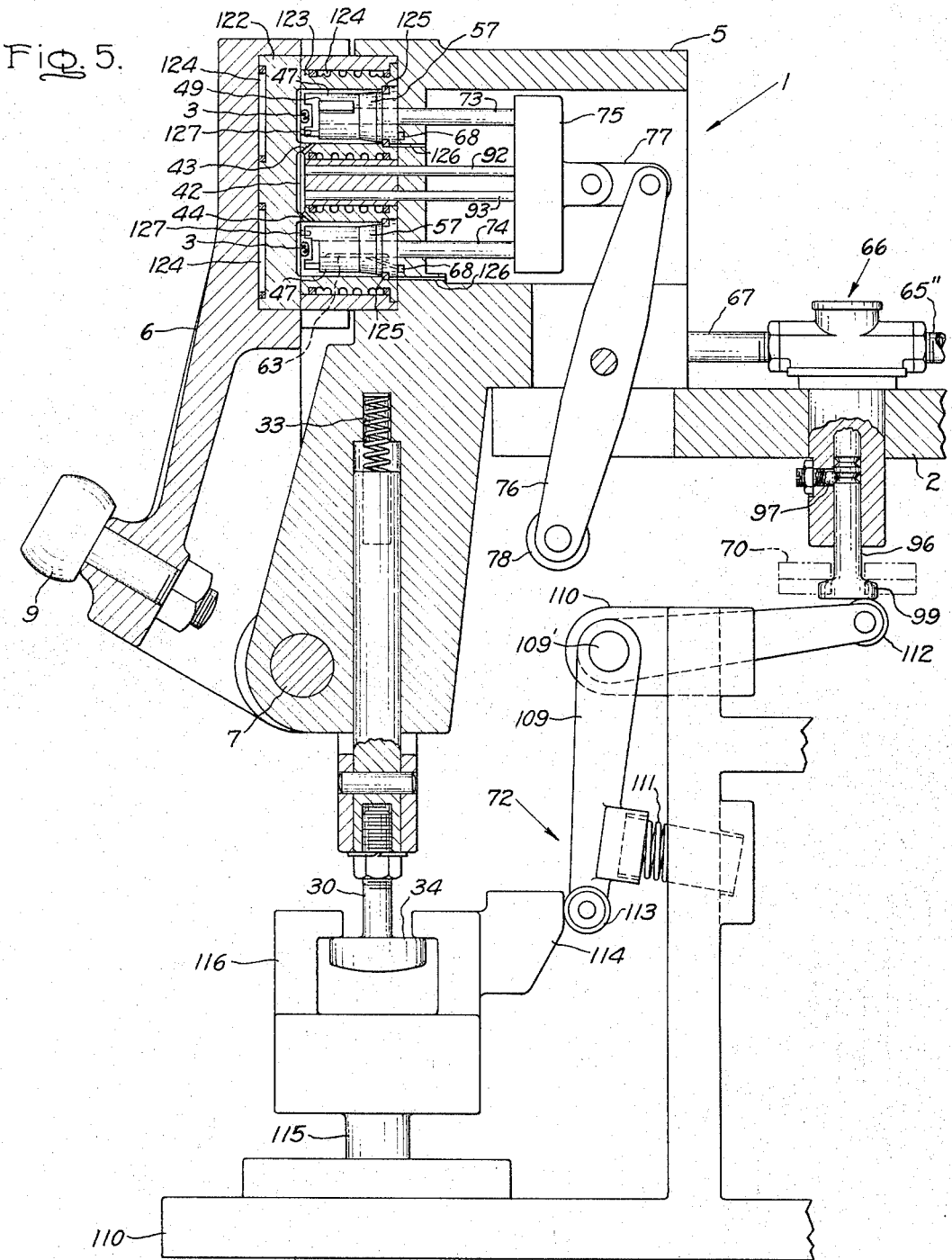

Oct. 10, 1967     A. J. MARX     3,345,687
INJECTION MOLDING APPARATUS
Filed June 10, 1964     4 Sheets-Sheet 4
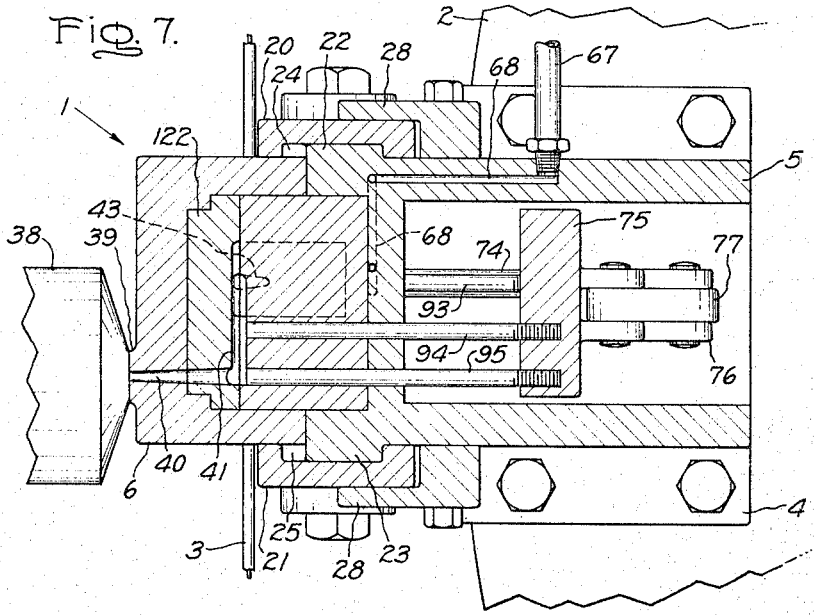
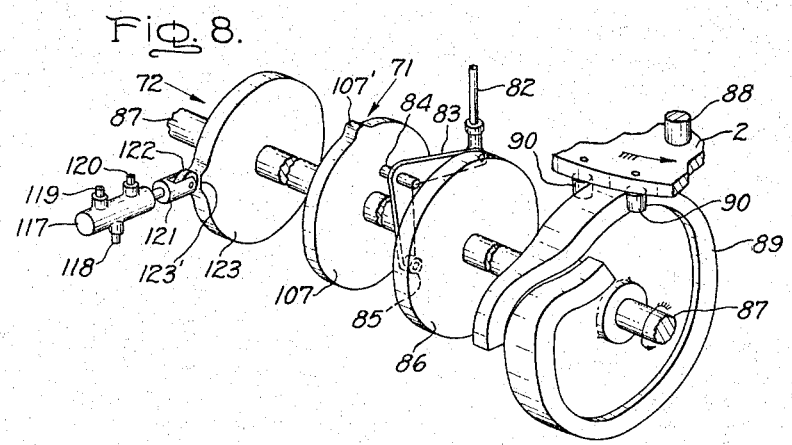
Inventor:
Arthur J. Marx
by Otto Vichy
His Attorney United States Patent Office 3,345,687
Patented Oct. 10, 1967

3,345,687
INJECTION MOLDING APPARATUS
Arthur J. Marx, Cleveland Heights, Ohio, assignor to General Electric Company, a corporation of New York
Filed June 10, 1964, Ser. No. 374,005
5 Claims. (Cl. 18—5)

The present invention relates to improvements in the injection molding apparatus of the type disclosed and claimed in copending application Ser. No. 323,825, filed Nov. 13, 1963, now Patent No. 3,284,853, patented Nov. 15, 1966, in which the present applicant along with Elton G. Moneymaker are named as joint inventors. In the molding apparatus of the copending application a series of molds is mounted on an indexing turret for forming in sequence on the insulated cord of a string set a plurality of socket bodies for electric lamp sockets of the type disclosed and claimed in Patent No. 3,128,141, filed June 30, 1961, issued Apr. 7, 1964, and assigned to the assignee of the present application.

The socket disclosed and claimed in the above-identified patent includes a molded socket body of stiffly flexible thermoplastic material having a hollow cylindrical shape and closed at one end. The socket body is provided with an inwardly opening recess in its side wall for accommodating a side strip contact. The side contact makes a pressure fit with the sides of the recess so that the contact is set into the cylindrical side wall of the socket body and the strip contact is provided with protuberances for engaging the screw threads of a lamp base accommodated by the socket. The insulated cord of the string set on which the socket body is molded extends laterally of the socket body through a thickness of the end wall.

The molding apparatus of the above-identified copending application includes a series of molds each having a pair of separable mold sections and a composite core member defining with said sections in the closed position of the latter, a cavity of the shape of the socket body. The composite core member has primary and secondary cores. The primary core is fixedly mounted on one of the mold sections and the secondary core is provided with a lateral projection which forms the side contact accommodating, inwardly opening recess in the cylindrical side wall of the socket body. The secondary core is mounted for forward longitudinal movement with respect to the primary core with the sections of the mold in open position so that the socket body may be stripped thereby from the primary core.

Stripping of the molded socket body from the primary core by forward movement of the secondary core is facilitated by the introduction of air under pressure into the interior of the molded socket body. For this purpose, the composite core member is constructed so as to pass air under pressure into the interior of the molded socket body and means is provided for forcing air through the composite core member after the molding of the socket body has been completed and with the sections of the mold in open position. In addition, an arm mounted and actuated so as to strike the molded socket body in the forwardmost position of the secondary core is provided to loosen the socket body from the laterally projecting portion of the secondary core.

The apparatus, as disclosed and claimed in the copending application, was successfully operated for an appreciable period but the speed of operation was limited by the time required for the thermoplastic material to attain sufficient rigidity for removal from the mold and also occasionally by difficulty experienced in removing the molded socket bodies from the mold due to the tendency of the socket bodies to stick to the surfaces of the composite core member.

The principal object of the present invention is to provide an injection molding apparatus of the above type wherein the above difficulties are overcome in a simple and expeditious manner.

Another object of the invention is to provide a method of molding a hollow article from organic plastic material which is fluid when hot and which is subject to shrinkage on solidification which method reduces the time required for molding the hollow article as well as facilitating the removal of the article from the mold in which it is formed.

Further objects and advantages of the invention will appear from the following description, the accompanying drawings and the appended claims.

In accordance with the invention, air under pressure is injected into the mold cavity through the composite core member simultaneously with the injection of the organic thermoplastic material into the mold cavity, or shortly thereafter, while the termoplastic material is in hot fluid condition. The thermoplastic material is injected at substantially greater pressure than that at which the air is injected and in its hot fluid condition the thermoplastic material completely fills the cavity to form a blank. The injection of air under pressure into the mold in the above manner is continued to apply pressure to the interior surface of the blank until the thermoplastic material has set or solidified in the mold.

The thermoplastic material of the blank shrinks somewhat when changing from a hot fluid state in which it is injected to the cool solid state while in the mold. Heretofore, shrinkage of the material has caused the blank to contract around the composite core member as the material solidifies with attendant difficulties in readily removing the molded socket body from the mold. Further, contraction of the blank tends to separate the outer surface thereof from the walls of the mold shaping this surface.

The application of air pressure to the interior surface of the blank while the thermoplastic material is in a soft fluid condition, in accordance with the present invention, overcomes the tendency of the blank to contract on the core on cooling and shrinking of the thermoplastic material so that the molded socket body does not hug the composite core member so tightly as to cause difficulties in removing the socket body from the molding apparatus.

In addition, the pressure exerted on the inner surface of the blank forces the outer surface thereof firmly against the wall of the mold so that the outer surface maintains the detail shape of the mold cavity. This, in a sense, expanded form of the blank also results in a more effective and rapid cooling of the blank since the outer surface thereof forced into firm contact with the wall of the mold presents a substantially larger heat dissipating area than the inner surface. The improvement of the present invention has resulted in an increase of approximately 44% in the rate of production of socket bodies molded on insulated cords by the apparatus of the above copending application.

In the drawings accompanying and forming part of this specification, an injection molding apparatus embodying the invention is shown in which:

FIG. 4 is a front view of the mold.

FIG. 5 is a vertical section through the mold taken along the line 5—5 in FIG. 4.

FIG. 6 is a side elevational view of the mold in open position showing the ejector means of the apparatus and the means for injecting air into the mold cavity through passages in the core members.

FIG. 7 is a section along the line 7—7 of FIG. 4 showing the injection passages for the organic plastic molding material, the ejector mechanism for the sprue and the passage for air into the core member, and FIG. 8 is a diagrammatic perspective view of the cams of the drive mechanism for the molding apparatus.

Figure 1:
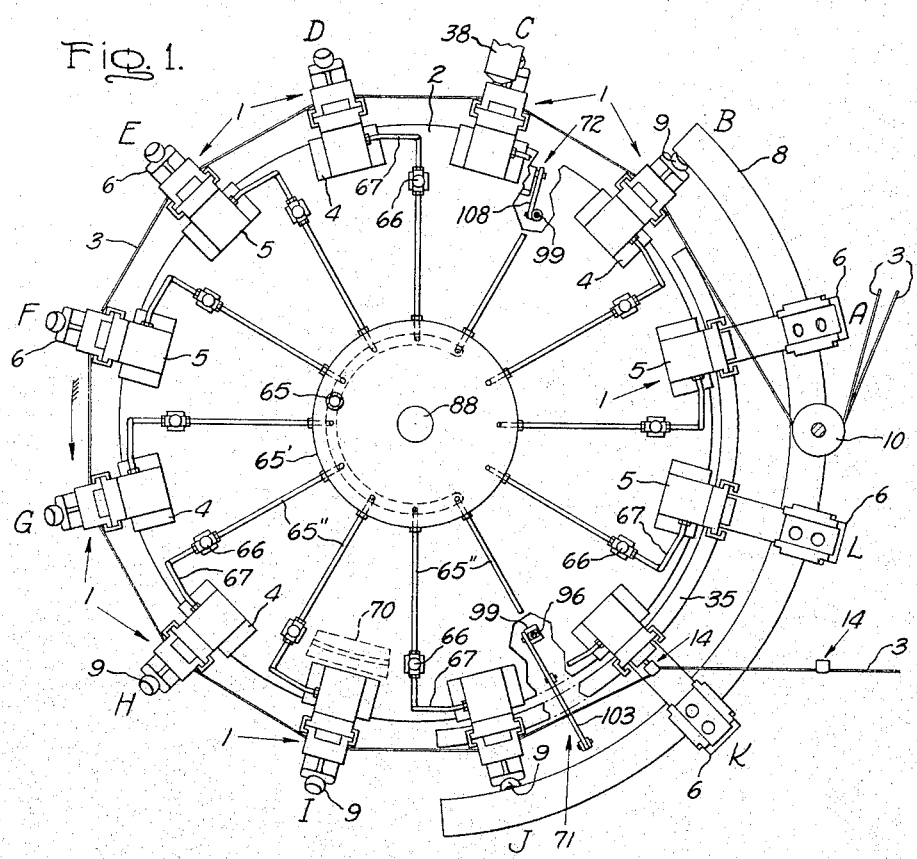
FIG. 1 is a diagrammatic plan view of the molding apparatus.

Referring to FIG. 1 of the drawings, the molding apparatus comprises a series of split, multiple, two section molds 1 mounted on the periphery of a turret 2 adapted to be rotated intermittently step-by-step in the direction of the arrow to bring the molds in succession to different stations. At station A the molds are open for the introduction therein of the cords 3 or the string sets. At station B the molds are closed about the cords and at station C the closed molds are charged with hot organic plastic molding material. Stations D, E, F, G, H, I and J are cooling stations and station K is a take-out station at which the molds are open and the socket bodies molded on the cords are removed. The molds are in open position at stations K, L and A.

Figure 2:
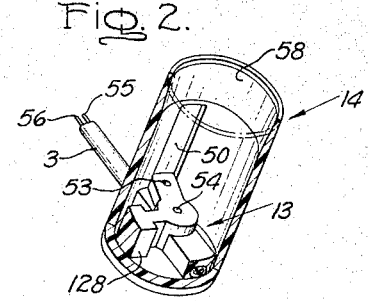
FIG. 2 is a perspective view of a lamp socket body molded on a two conductor electric cord by the apparatus shown in the drawings.

Each of the multiple, split molds 1 mounted at the periphery of the turret 2 define two cavities, each of the shape of the socket body shown in FIG. 2. The main body part 4 of the mold 1 is bolted to the turret 2 and fastens the section 5 of the mold in fixed position on the turret 2. The outer section 6 of the mold is supported on part 4 by the pivot pin 7 for movement into mold closed and mold open positions. In FIG. 5 the mold is shown in closed position and in FIG. 6 the outer mold section 6 is shown in a tilted, mold open position in which it is below the level of the cavities defined by the mold section 5 to allow the socket bodies molded on the cords to be removed from the mold. The mold section 6 remains in its tilted position at stations L and A for the introduction of cords between the open mold sections at station A.

The mechanism for moving the mold section 6 into its open and closed positions includes a stationary cam track 8 and a cam follower in the form of a roller 9 mounted on the mold section 6. The roller 9 engages the cam track 8 which is U-shaped in cross section as shown in FIG. 6. The roller 9 is in engagement with the cam track 8 as the mold is carried by the turret in the direction of the arrow (FIG. 1) from station J to station B. The changes in elevation of the cam track 8 are such that the mold section 6 is moved into its open, tilted position between stations J and K into its mold closed position between stations A and B. The mold section 6 is in its open position at stations K, L and A.

The cords 3 are drawn from reels (not shown) as the turret 2 is rotated step-by-step and each cord is guided into proper position in the open molds at station A by a stationary guide roller 10 mounted on the frame of the apparatus ahead of station A.

At station B the cords 3 are clamped between the mold sections 5 and 6, extend across the part of the mold cavities forming the end wall 13 of the socket body 14 (FIG. 2) and are located in the recesses 15 and 16 of the mold section 5 which match the recesses 17 and 18 of the mold section 6. These recesses in the closed position of the mold define openings in opposite sides of the closed mold for accommodating the cords 3 traversing the molds as shown in FIG. 4, the recesses in the mold sections being shown in FIG. 6.

At station B the mold sections 5 and 6 are locked together, after being closed as described above. As best shown in FIGS. 4, 5, 6 and 7 the mold locking mechanism includes slides 20 and 21 mounted for vertical movement on opposite sides of the mold section 5. The slides 20 and 21 have diverging side flanges which in the lowered locking position of the slides engage the wedge-shaped continuous lips 22 and 23, respectively, on the mold section 5 and the series of space lips 24 and 25, respectively, on the mold section 6 to lock the mold sections 5 and 6 together, as shown in FIG. 7. The flange of the slides adapted to engage the series of lips 24 and 25 each have a series of slots 26 and 26′ for passage of the lips 24 and 25 therethrough as the mold section 6 is moved into and out of its closed position. Brackets 27 and 28 are secured to the mold section 5 and overlap the slides 20 and 21, respectively, to maintain the slides in engagement with the lips on the mold sections by preventing lateral movement of the slides away from the mold sections.

Movement of the slides 20 and 21 into their locking and unlocking positions is accomplished through the vertical push rod 30 mounted for sliding movement on the mold part 4 as shown in FIGS. 4, 5 and 6 and connected to the slide members 20 and 21 by the links 31 and 32, respectively. The rod 30 is urged downwardly by spring 33 (FIG. 5) in part 4 to hold the slides 20 and 21 in their locking position at stations B to J, inclusive. At stations K to A, inclusive, the slides 20 and 21 are in a lifted position in which the mold sections are unlocked. The slides 20 and 21 are lifted against the force of spring 33 to unlock the molds by engagement of the head 34 of the rod 30 with the stationary track 35. The changes in elevation along track 35 are such that the slides 20 and 21 are in their lifted, unlocked position with respect to the mold sections 5 and 6 before the mold section 6 is tilted into its open position as the mold is carried from station J to station K and are in a lowered or locked position at station C after the mold section 6 is moved into its closed position as the mold is carried from station A to station B.

The closed molds 1 are carried from station B to station C where the sections 5 and 6 thereof are locked together as described below and where the injection nozzle 38 is brought into engagement with the opening 39 of the injection passages of the mold for filling completely the mold cavities with hot thermoplastic material, such as polypropylene. The communicating passages leading from the said opening 39 into the mold cavities are shown in FIGS. 5 and 7 and include the tapered passage 40 extending through the mold section 6, the passages 41 and 42 defined by the closed mold sections 5 and 6 and the passages 43 and 44 defined by the mold section 5 and opening into the sides of the mold cavities.

Figure 3:
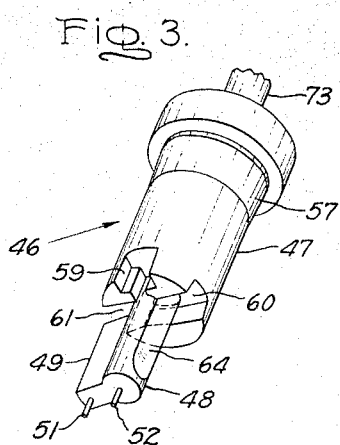
FIG. 3 is a perspective view of a composite core of the molding apparatus, the primary and secondary cores being longitudinally disposed as at the time of ejection of the socket body.

Each of the split multiple molds 1 has a composite core 46 in each of its socket molding cavities, one of which is illustrated in FIG. 3 of the drawings. The core shapes the interior surfaces of the molded socket body in the form shown in FIG. 2 of the drawings. Each composite core 46 is made up of a primary core 47 and secondary core 48, the primary core being fixedly mounted on the mold section 5 as shown in FIG. 5 of the drawings. The secondary core 48 is mounted for movement longitudinally of the primary core 47 between a retracted molding position within in the primary core as shown in FIG. 5 and a forward ejection position with respect to the primary core (FIGS. 3 and 6) in which last position the molded socket body 14 with the conductor cord 3 molded therein may be removed from the molding apparatus as described below.

The secondary core 48 has a lateral projection 49 thereon for forming a side strip electrical contact accommodating recess 50 in the inner surface of the cylindrical side wall of the socket body 14 and has also two longitudinal projections 51 and 52 at the foremost end thereof for forming cavities 53 and 54, respectively, in the end wall 13 of the socket body directly above each of the electrical conductors 55 and 56, respectively, of the cord 3 molded in and extending through the end wall 13 of the socket body 14 as shown in FIG. 2. The cavities facilitate insertion of the electrical socket contacts consisting of a center contact and a side contact each having pointed ends which ends, in assembling the socket, are thrust through the cavities 53 and 54 and through the conductors 55 and 56 located therebeneath to make electrical contact with the conductors and to stake the socket body to the cord 3. The conductor 56 of the cord 3 extends along a diameter of the end wall 13.

The primary core 47 has a cylindrical outer surface slightly flaring at its inner end 57 to form the tapered inner surface 58 at the open end of the socket body 14 and three recesses 59, 60 and 61 at its outer end which, together with the outer end surface of the secondary core 48 in the molding position of the latter shape the end wall 13 of the socket body, as shown in FIG. 2 of the drawings.

A passage 63 (FIG. 5) for air under pressure is defined for the most part by the inner cylindrical surface of the primary core 47 and groove 64 in the secondary core 48 but also includes the indiscernible spaces between the cores 47 and 48. During operation of the apparatus the air under pressure supplied to the passage 63 bleeds through the almost indiscernible space between end and side mating surfaces of the primary core 47 and secondary core 48 and exerts pressure on the inner surface of the blank of soft thermoplastic material filling the mold cavity with the advantageous results described above. The air under pressure is supplied to passage 63 from a source (not shown) through the system comprising the main source pipe 65, the stationary and rotating portions of the rotary coupling 65', pipe 65'', valve 66, pipe 67 and passages 68 in the mold section 5, as shown in FIGS. 1, 5, 6 and 7 of the drawings.

The valve 66 is in its open position at station C through stations D, E, F, G and H so that air pressure is maintained on the inner surface of the blank while the blank is cooling from a hot fluid condition to a solid condition. At station I the stem of the valve 66 is pulled downward by the means (FIGS. 1 and 7) described below and the valve 66 is then in its closed position in which position it stops the flow of air into passage 63 before the mold section 6 is moved into its open tilted position between stations J and K. This avoids loss of air pressure in the air pressure system. At station K the secondary core 48 is moved from its retracted molding position into its forwardmost position to strip the molded socket body from the primary core 47. This movement of core 48 opens the passage 63 fully to the interior of the molded socket body so that air under pressure in the passage 63 which bleeds through the small spaces between the cores 47 and 48 in the retracted position of the latter is released to apply a larger volume of air under pressure to the socket body to facilitate its removal from the composite core. For this purpose the valve 66 is opened while the mold is at dwell at station K and before the secondary core 48 is moved from its retracted molding position and is closed immediately after the passage 63 has been opened fully to apply a puff of air to the socket body. The mechanism for opening and closing valve 66 at station K is shown at 71 in FIGS. 1, 6 and 8 and is described later herein.

The valve 66 remains closed at stations L, A and B and is open at stations C through H as described above. The mechanism for reopening the valve 66 at station C is shown at 72 in FIGS. 1, 5 and 8 and is described below.

The mechanism for moving the secondary core 48 into its forwardmost position at station K includes the ejector pins 73 and 74 (FIG. 5), one for each of the secondary cores of the mold, the connecting plate 75 to which the ejector pins are fastened, the lever arm 76 pivotally connected to the connecting plate at 77, the roller 78 mounted on the lever arm, the angle lever arm 79 (FIG. 6) pivoted at 80 on the support 81 and engaging the roller 78, the connecting rod 82 shown in FIGS. 6 and 8, the angle lever arm 83 pivoted at 84 on the frame of the apparatus, the cam follower 85 and the face cam 86 affixed to the drive shaft 87 of the turret 2 of the apparatus. The turret is mounted for rotation on column 88.

On each revolution of the drive shaft 87 the index cam 89 shown in FIG. 8 moves the turret 2 provided with a series of spaced cam followers 90 one step around the supporting column 88 of the turret in the direction of the arrow to carry each mold 1 into a succeeding station with a dwell at each station. As a mold is carried into station K the roller 78 is brought into engagement with the arm 79. On each revolution of the drive shaft 87 and with the turret at dwell the ejector pins 73 and 74 actuated as above move the secondary cores 48 of the particular mold 1 then located at section K from a retracted molding to a forward position and back again with a dwell in the forward position for removal of the molded socket bodies from the lateral projections 49 on the secondary cores 48, as described below.

As the socket bodies are carried forward by the secondary cores 48 they are stripped from the primary cores 47 and their connection with the plastic material filling the injection passages 43 and 44 is broken. The sprue constituted by the organic plastic material in the injection passages 40 to 44 is exposed on opening of the mold and is supported solely by mold section 5. The sprue is ejected from the mold section 5 by the same mechanism by which the secondary cores 48 are moved into their foremost positions. For this purpose four ejector pins 92, 93, 94 and 95 (FIGS. 5 and 7) are connected to the plate 75 and extend through the mold section 5 into engagement with the sprue as shown. As the pins 92 to 95 are advanced the sprue is forced from the mold section 5 and falls away from the mold.

Before the secondary cores 48 are actuated as described above, the valve 66 is opened and remains open a short time while the secondary cores 48 are moved to open the passages 63 and to strip the molded socket bodies from the primary cores 47. This introduces a puff of air into the interior of the socket bodies to assist in stripping them from the primary cores 47.

The mechanism 71 (FIGS. 1 and 6) for opening and closing the valve 66 at station K includes the valve stem 96, the spring-pressed ball stop 97, the yoke 98 engaging the head 99 of the stem 96, the rod 100 passing through guide 101, the link 102, the lever arm 103 pivoted at 104 on the stationary support 105 and cam follower 106 engaging cam 107 mounted on shaft 87.

As the mold enters station K, the valve 66 is in its closed position and the head 99 of the valve stem 96 is moved into the yoke 98 as shown in FIG. 6. Just before the secondary cores 48 are actuated as described above, the valve stem 96 is moved upwardly to open the valve 66. Upward movement of the valve stem 96 takes place as the protuberance 107' on cam 107 passes under roller 106 and lifts arm 103 to move rod 100 and therewith valve stem 96 upwardly a sufficient distance to open valve 66. As soon as the cores 48 have been moved forwardly a sufficient distance to strip the molded socket bodies from the primary cores 47, the valve stem 96 is moved downwardly to again close the valve 66 and shut off the air. This downward movement of valve stem 96 is caused by the protuberance 107' traveling beyond the roller 106 to allow arm 103 to return to its lowered position under the influence of a spring 108 extending from a stationary frame portion. In FIG. 6 the mechanism 71 and the cam 107 are shown after the valve stem 96 has been moved from its valve open to its valve closed position. As the mold is moved from station K toward station L the head 99 of the valve stem 96 is moved out of the yoke 98 and the valve 66 remains closed until it is again reopened at station C by the mechanism 72 shown in FIGS. 5 and 8.

The mechanism 72 is shown in FIG. 5 in its position on opening the valve 66 and, as shown, includes the bell crank lever arm 109 pivotally mounted at 109' on stationary support 110 and urged by spring 111 toward its normally disengaged position with respect to valve stem 96. Roller 112 mounted on one end of arm 109 engages the head 99 of the valve stem 96 and roller 113 on the opposite end of arm 109 is engaged by cam 114 mounted on the piston 115 of air cylinder 116 affixed to the stationary support 110. Also mounted on piston 115 is the yoke 116 which engages the head 34 of the push rod 30 to pull down the locking slides 20 and 21 more securely into their locking positions in which position they are held by spring 33 as described above.

In FIG. 5 of the drawings, the piston 115 is shown in its downwardmost position in which position the mold sections 5 and 6 are firmly locked together and the valve 66 is fully opened. After the thermoplastic material has been injected into the mold and before the mold is carried away from station C, piston 115 is moved upwardly to disengage the yoke 116 from the head 34 and the roller 112 from the head 99 and arrange the mechanism 72 to receive the stem 96 of the valve of another mold. The movement of piston 115 is controlled by air valve 117 (FIG. 8) in proper time sequence to lock the mold sections 5 and 6 together and to open the valve 66 with the mold at dwell at station C just prior to the injection of the thermoplastic material into the mold through nozzle 38.

The air valve 117 is provided with a conduit 118 connected to a source of air under pressure and two ports 119 and 120 connected to opposite ends of the cylinder 116. The valve 117 is provided with a spring-pressed valve stem 121 having a roller 122 engaging the cam 123 mounted on the shaft 87.

With the turret 2 at dwell and with a mold at station C, the protuberance 123' on cam 123 forces valve stem 121 inwardly to connect the port 120 of the valve 117 to the conduit 118 to force the piston 115 from its normally fully up position to its fully down position shown in FIG. 5. After the mold sections 5 and 6 have been locked together and the valve 66 has been opened, cam protuberance 123' passes beyond roller 122 to allow outward movement of valve stem 121 to close port 120 and open port 119 to force piston 115 upwardly to disengage yoke 116 from head 34 and roller 112 from head 99.

The means 70 for closing the valve 66 at station I is shown in phantom in FIGS. 1 and 5 and consists of a stationary cam track which by changes in elevation engages the top of head 99 of valve stem 96 to pull the stem downwardly as the mold is moved through station I so that the valve 66 is closed and remains closed until reopened by the mechanism 71 at station K as described above.

On release of the socket bodies 14 from the mold 1 at station K and on movement of the mold from station K toward station L, the cords 3 with the socket bodies molded thereon are pulled away from the molding apparatus. Thereafter each of the socket bodies is provided with a center pin contact inserted in the cavity 54 with its end piercing and making electrical contact with conductor 56 and a side strip contact inserted in cavity 53 and recess 50 with its end piercing and making electrical contact with conductor 55. The cords may be divided into lengths suitable for lighting string sets and a male and female plug may be attached to opposite ends of each string set in the conventional manner.

The mold sections 5 and 6 include mold inserts 122 and 123 defining with the main body of the mold sections passages 124 for the circulation of cooling fluid about the mold cavities (FIG. 5). The passages are connected with a source (not shown) of cooling fluid which is circulated through the mold sections continuously during operation of the molding apparatus. Such cooling systems are of conventional structure and well-known in the art and have not been illustrated in the drawings as they constitute no part of the present invention.

The mold section 5 is vented to allow air to escape as the hot fluid thermoplastic material is injected at high pressure, for example 8,000 to 15,000 pounds per square inch pressure, into each cavity of the locked mold at station C and in an amount sufficient to fill the cavity completely to form a blank. The vents include a ring 125 of porous metal and a passage 126 extending from the ring to the outside of the mold section 5. As pointed out above, air is forced into each cavity continuously, suitably at a pressure of about 30 to 120 pounds per square inch, while the mold is carried from station C to station I and escapes slowly, if at all, through the vents. The outer surface of the blank thus is forced firmly against the walls of the cavity for effective cooling and any tendency of the blank to contract and grip the composite core member is overcome to the end that the rate of cooling of the blank in the mold is rapid and removal of the blank from the mold in the form of a molded socket body is facilitated.

If the pull exerted on the cords 3 is insufficient to pull the molded socket bodies from the composite core members at station K, the socket bodies may be removed by hand or means to strike the socket bodies at a point diametrically opposite the projection 49 on the core member 48 when the latter is in its forwardmost position may be provided as in the copending application referred to above.

The time at which the air is forced into the mold at station C with respect to the time the thermoplastic material is injected into the mold cavities is not critical. That is, the air may be forced into the cavities shortly before, at the same time, or shortly after the thermoplastic material is injected. Of course, the mold sections 5 and 6 are firmly locked together before the thermoplastic material is injected into the mold at station C. In the particular apparatus shown, air is forced into the cavities by opening of the valve 66 at the time the mold sections 5 and 6 are locked together. Thus, in the particular apparatus the cavities are filled with air under pressure when the thermoplastic material is injected therein. However, this does not prevent the thermoplastic material filling the cavities completely because the air is at comparatively low pressure with respect to the pressure at which the thermoplastic material is injected and the air is forced out of the cavities through the vents on injection of the thermoplastic material. When desired, the details of the apparatus may be changed to delay the introduction of air under pressure into the mold cavities until after the mold sections 5 and 6 have been locked together and the thermoplastic material has been injected into the cavities. The only requirement being that the air pressure is applied shortly after the injection of the thermoplastic material so that pressure is applied to the inner surface of the blank while the thermoplastic material is in a hot, soft, fluid condition within the mold cavities.

The mold section 6 is provided with projections 127 (FIG. 5) which form an outwardly opening cavity in the part 128 of the end wall 13 of each of the socket bodies 14. The cavities thus formed in the socket bodies accommodate the end of a clip for supporting the socket body in use of the string sets for Christmas tree decoration, for example.

While the best mode of carrying out the invention has been shown and described above, it will be understood that changes and modifications may be made by those skilled in the art without departure from the spirit and scope of the invention as defined in the appended claims.

What I claim as new and desire to secure by Letters Patent of the United States is:

1. An injection molding apparatus for hollow articles comprising a separable mold defining a cavity of the shape of the desired article, means for injecting hot organic plastic molding material subject to shrinkage on cooling into the mold cavity in an amount sufficient to fill the cavity completely to form a blank, means for applying to the inner surface of the blank fluid pressure of sufficient strength to overcome the tendency of the blank to contract on shrinkage of the molding material while cooling and means for maintaining the fluid pressure on the inner surface of the blank for a predetermined time sufficient for the molding material to solidify.

2. In an injection molding apparatus for forming hollow articles comprising a pair of separable mold sections and a composite core member including a primary and a secondary core defining with said mold sections in the closed position of the latter a cavity of the shape of the desired hollow article, the primary core being fixedly mounted on one of said mold sections, the secondary core being mounted for longitudinal movement with respect to the primary core on separation of said mold sections from a retracted molding position into a forward position to strip the molded article from the primary core and support the article in front of the mold section carrying the primary core for facilitating separation of the molded article from the mold, the improvement comprising means for applying to the entire inner surface of the blank of hot injected organic plastic material subject to shrinkage on cooling filling the mold cavity fluid pressure of sufficient strength to overcome the tendency of the blank to contract on the composite core on shrinkage of the molding material while cooling and means for maintaining the fluid pressure on the inner surface of the blank for a predetermined time sufficient for the molding material to solidify thereby to facilitate stripping of the molded article from the primary core.

3. The improvement in injection molding apparatus according to claim 2 wherein the means for applying fluid pressure to the inner surface of the blank includes a passage in the composite core member.

4. The improvement in injection molding apparatus according to claim 2 wherein the means for applying fluid pressure to the inner surface of the blank includes a passage in the composite core member partially closed in the molding position of the secondary core and fully open in the forwardmost position of the secondary core.

5. The improvement in injection apparatus according to claim 4 wherein the fluid pressure applying means includes also valve means connected to said passage and the means for maintaining the fluid pressure includes means for controlling the opening and closing of said valve means, said valve control means being operable to open said valve means with said mold sections closed and with the secondary core in its fully retracted molding position, to close said valve means while said mold sections are separated and to momentarily open said valve means on movement of said secondary core from its retracted molded position to its forwardmost position during separation of said mold sections.

References Cited

UNITED STATES PATENTS

| 2,789,312 | 4/1957 | Borer | 18—5 |
| 3,170,970 | 2/1965 | Adams | 264—94 |
| 3,172,929 | 3/1965 | Santelli | 264—97 |
| 3,204,293 | 9/1965 | Brownson et al. | 18—5 |

J. SPENCER OVERHOLSER, *Primary Examiner.*

WILBUR L. McBAY, ROBERT F. WHITE, *Examiners.*

R. B. MOFFITT, *Assistant Examiner.*